United States Patent
Adachi

(10) Patent No.: US 11,004,191 B2
(45) Date of Patent: May 11, 2021

(54) INDUSTRIAL DEVICE IMAGE RECOGNITION PROCESSOR AND CONTROLLER

(71) Applicant: Kabushiki Kaisha Yaskawa Denki, Kitakyushu (JP)

(72) Inventor: Masaru Adachi, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 72 days.

(21) Appl. No.: 16/441,031

(22) Filed: Jun. 14, 2019

(65) Prior Publication Data

US 2019/0295244 A1 Sep. 26, 2019

Related U.S. Application Data

(63) Continuation of application No. PCT/JP2017/036974, filed on Oct. 12, 2017.

(30) Foreign Application Priority Data

Dec. 19, 2016 (JP) .............................. JP2016-245763

(51) Int. Cl.
| | | |
|---|---|---|
| *G06T 7/00* | (2017.01) | |
| *G06K 9/62* | (2006.01) | |
| *G06K 9/00* | (2006.01) | |
| *G06N 3/08* | (2006.01) | |

(52) U.S. Cl.
CPC ........ *G06T 7/0004* (2013.01); *G06K 9/00523* (2013.01); *G06K 9/628* (2013.01); *G06K 9/6256* (2013.01); *G06N 3/08* (2013.01)

(58) Field of Classification Search
CPC ......... G06T 7/0004; G06T 2207/20081; G06T 2207/20084; G06K 9/00523; G06K 9/00536; G06K 9/6256; G06K 9/6267; G06K 9/628; G06N 3/08
See application file for complete search history.

(56) References Cited

U.S. PATENT DOCUMENTS

| | | | |
|---|---|---|---|
| 2009/0220156 A1 | 9/2009 | Ito et al. ...................... 382/201 |
| 2010/0000838 A1* | 1/2010 | Hamasaki ................ G07D 7/00 |
| | | | 194/207 |
| 2013/0141570 A1 | 6/2013 | Saruta et al. ............ G06K 9/78 |
| 2016/0300125 A1 | 10/2016 | Barker ................. G06K 9/6256 |
| 2016/0321540 A1 | 11/2016 | Towal ....................... G06N 3/08 |
| 2016/0379091 A1* | 12/2016 | Lin et al. ........... G06K 9/00724 |
| | | | 382/156 |
| 2017/0116497 A1* | 4/2017 | Georgescu etal. ... A61B 8/5223 |

FOREIGN PATENT DOCUMENTS

| | | | |
|---|---|---|---|
| EP | 3065090 A2 | 9/2016 | ............... G06N 3/04 |
| JP | 2009211178 A | 9/2009 | |
| JP | 2011-235386 A | 11/2011 | |
| JP | 2013117795 A | 6/2013 | |
| JP | 2014093023 A | 5/2014 | |
| JP | 2015203680 A | 11/2015 | |
| JP | 2016-203293 A | 12/2016 | |

OTHER PUBLICATIONS

Search Report dated Jul. 7, 2020, for corresponding EP Patent Application No. 17883649.0.
International Search Report for PCT/JP2017/036974, pp. 1 and 2. dated Jan. 16, 2018.
Int' l Prelim. Report on Patenability PCT/JP2017/036974, dated Oct. 12, 2017, pp. 1-8.
Office Action(Reconsideration Report by Examiner before Appeal) dated Mar. 12, 2021, for corresponding JP Patent Application No. 2018-557561 with English translation pp. 1-6.

* cited by examiner

*Primary Examiner* — Andrew W Johns
(74) *Attorney, Agent, or Firm* — HEA Law PLLC

(57) ABSTRACT

An image recognition processor for an industrial device, the image recognition processor implementing, on an integrated circuit thereof, the functions of storing an image data processing algorithm, which has been determined based on prior learning; acquiring image data of an image including a predetermined pattern; and performing recognition processing on the image data based on the image data processing algorithm to output identification information for identifying a recognized pattern.

3 Claims, 8 Drawing Sheets

_US 11,004,191 B2_

INDUSTRIAL DEVICE IMAGE RECOGNITION PROCESSOR AND CONTROLLER

CROSS-REFERENCE TO RELATED APPLICATION

The present application is continuation of International Application No. PCT/JP2017/036974 filed on Oct. 12, 2017, which claims priority from Japanese Application No. JP 2016-245763 filed on Dec. 19, 2016. The contents of these applications are hereby incorporated by reference into this application.

BACKGROUND OF THE INVENTION

1. Field of the Invention

An embodiment of this disclosure relates to an image recognition processor for an industrial device and a controller.

2. Description of the Related Art

In Japanese Patent Application Laid-open No. 2011-235386, there is described a control device configured to recognize a grasping-target object, for example, based on imaging information of a camera provided on a hand of a robot arm.

SUMMARY OF THE INVENTION

However, a processing device itself, which is configured to perform image recognition, has used a server via a network or a processing device of a large circuit scale, and hence practical applicability of image recognition processing in a case of application to such an industrial device as in factory automation has been low.

The present invention has been made in view of the above-mentioned problem, and therefore has an object to provide an image recognition processor for an industrial device and a controller, which are capable of improving practical applicability of image recognition processing.

In order to solve the above-mentioned problems, according to one aspect of the present invention, there is employed an image recognition processor for an industrial device, the image recognition processor implementing, on an integrated circuit thereof, the functions of: storing an image data processing algorithm, which has been determined based on prior learning; acquiring image data of an image including a predetermined pattern; and performing recognition processing on the image data based on the image data processing algorithm to output identification information for identifying a recognized pattern.

Further, according to another aspect of the present invention, there is employed an image recognition processor for an industrial device, the image recognition processor including: a storage unit configured to store an image data recognition processing algorithm, which is generated by performing recognition processing on and learning image data including an appearance pattern of an object having a predetermined attribute; and a recognition processing unit configured to perform recognition processing of the appearance pattern included in an image of the image data with use of the image data recognition processing algorithm.

Further, according to still another aspect of the present invention, there is employed a controller, which is configured to perform predetermined subsequent control on an object to be controlled, which corresponds to a pattern recognized in the image recognition processor for an industrial device.

According to the aspects of the present invention, it is possible to improving practical applicability of image recognition processing.

DESCRIPTION OF THE EMBODIMENTS

Now, an embodiment of this disclosure is described with reference to the drawings.

<Schematic Configuration of Picking System>

Figure 1:
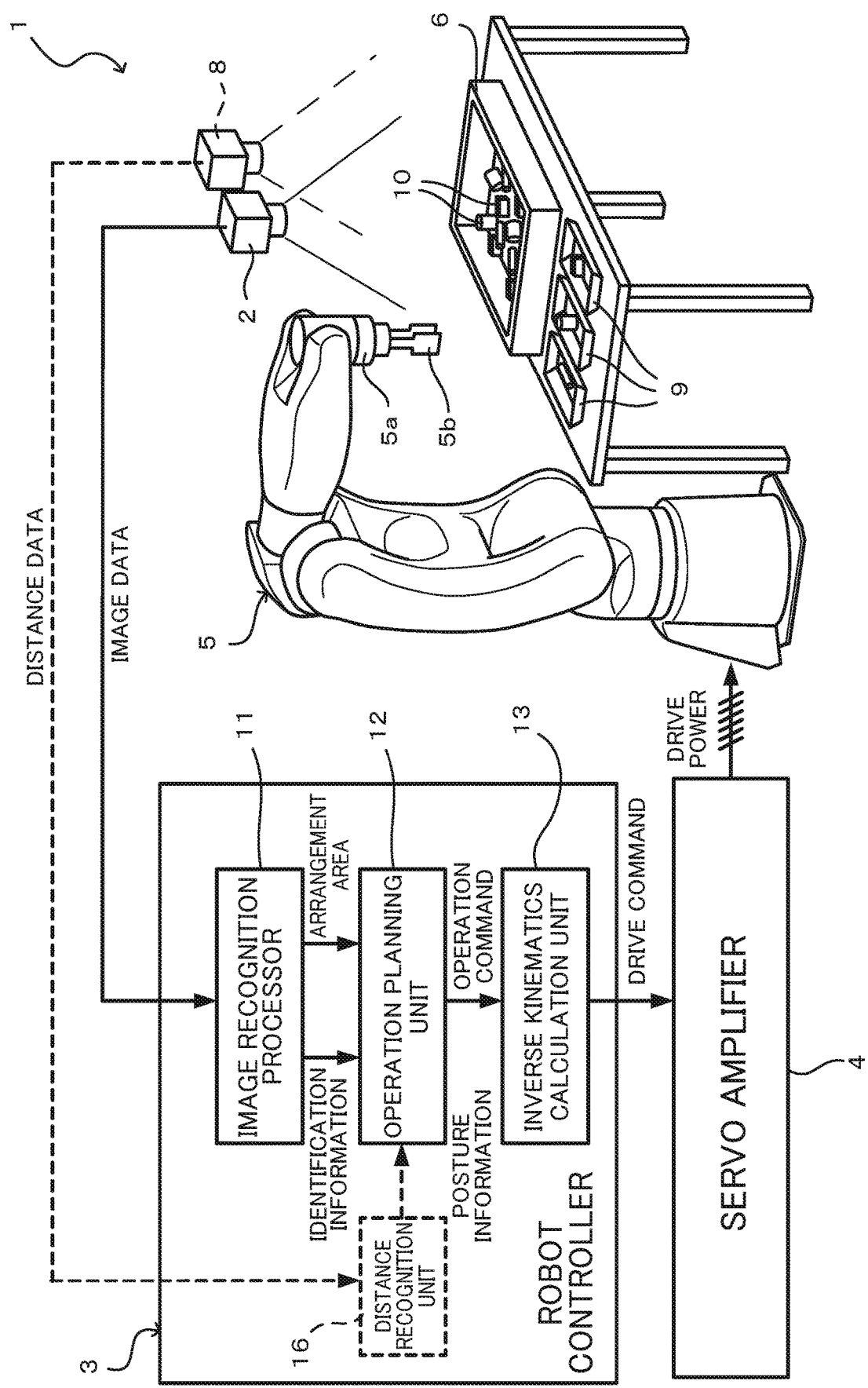
FIG. 1 is a diagram for illustrating an example of a schematic system block configuration of a picking system including an image recognition processor according to an embodiment of this disclosure.

In FIG. 1, there is illustrated an example of a schematic system block configuration of a picking system including an image recognition processor for an industrial device according to this embodiment. The picking system is a system configured to perform picking so as to classify a large number of industrial parts of a plurality of types, which are randomly arranged in a container, into the types and divide the classified industrial parts into a plurality of target bins. In FIG. 1, a picking system 1 (industrial device) includes a camera 2, a robot controller 3, a servo amplifier 4, and a picking robot 5. The picking system 1 may further include a three-dimensional sensor 8.

In this example, the industrial parts are given as objects to be picked. However, the objects to be picked may be foods, cosmetics, stationery items, and the like instead of the industrial parts as long as the objects are treated in a production line. Of those objects, a feature that is common to objects of one type is expressed as an attribute. Examples of the attribute include a shape, a size, a color, a pattern, and a gloss.

The camera 2 in this example is an image pickup device configured to optically capture image data of a two-dimensional pixel array. The camera 2 is arranged above a container 6, and is capable of imaging the whole of a large number of industrial parts 10 (objects, objects to be controlled) of a plurality of types, which are arranged in random postures inside the container 6. Moreover, the three-dimensional sensor 8 in this example is a sensor configured to optically acquire data on a distance to points on a surface of the object. As same with the camera 2, the three-dimensional sensor 8 is arranged above the container 6, and is capable of imaging the whole of the industrial parts 10 inside the container 6.

The robot controller 3 is configured to perform, on the basis of the image data captured by the above-mentioned camera 2, and further on the basis of distance data from the three-dimensional sensor 8 as required, processing regarding a picking operation of the picking robot 5 to output a drive command to the servo amplifier 4. The robot controller 3 includes an image recognition processor 11, an operation planning unit 12, and an inverse kinematics calculation unit 13. Moreover, when the three-dimensional sensor 8 is used, the robot controller 3 further includes a distance recognition unit 16.

The image recognition processor 11 (image recognition processor for an industrial device) is configured to perform image recognition on the image data captured by the above-mentioned camera 2. As a result, the image recognition processor 11 recognizes types of individual ones of a plurality of industrial parts 10 arranged in the container 6 at the time and output corresponding identification information, and to detect and output arrangement areas of individual ones of the industrial parts 10 in an image of the image data. A processing unit itself of the image recognition processor 11 in the example of this embodiment is formed of a single integrated circuit implemented as hardware. The image recognition processor 11 performs recognition processing of the types of the industrial parts 10 and detection processing of the arrangement areas of the industrial parts 10 by machine learning using a neural network as internal processing. Details and methods of the processing by the image recognition processor 11 are described later in detail.

The operation planning unit 12 is configured to plan, on the basis of the identification information and the arrangement areas input from the above-mentioned image recognition processor 11, specific operation details (such as trajectory of a gripper 5b of an arm distal end portion 5a, which is to be described later) to be performed by the picking robot 5, and output an operation command generated on the basis of the specific operation details to the inverse kinematics calculation unit 13. There may be adopted a configuration in which, in the planning of the operation details, three-dimensional postures (orientations) of industrial goods are recognized by the distance recognition unit 16 on the basis of the distance data acquired by the three-dimensional sensor 8 as required, and are input as posture information to the operation planning unit 12. In this case, in the operation planning unit 12, the operation details are planned on the basis of not only the identification information and the arrangement areas but also on the posture information.

The inverse kinematics calculation unit 13 is configured to calculate, on the basis of the operation command input from the above-mentioned operation planning unit 12, target rotation angles of drive axis motors (not shown) of the picking robot 5 required to achieve the operation details (such as movement of the gripper 5b on the planned trajectory) of the operation command, and output corresponding drive commands.

The servo amplifier 4 is configured to perform, on the basis of the drive command input from the inverse kinematics calculation unit 13 of the above-mentioned robot controller 3, control to supply drive power for driving and controlling the drive axis motors (not shown) of the picking robot 5.

The picking robot 5 is a manipulator arm (six-axis robot) including six joint axes in the illustrated example of this embodiment. The picking robot 5 includes the gripper 5b provided to the arm distal end portion 5a, which is capable of gripping an industrial part 10. As a result, the picking robot 5 has a capability to transport the industrial parts 10 in the container 6 one by one to nearby target bins 9.

According to the picking system 1 of this embodiment configured as described above, the robot controller 3 can grasp arrangement positions of the industrial parts 10 inside the container 6 on the basis of the input image data. Specifically, the robot controller 3 can perform calculation for converting coordinates on the basis of an installation position of the camera 2 in operation coordinates (not particularly shown) set in the picking robot 5, and the arrangement areas of the industrial parts 10 output by the image recognition processor 11 in the image of the image data. As a result, the robot controller 3 can grasp the arrangement positions of the industrial parts 10 inside the container 6 in the operation coordinates. Moreover, the robot controller 3 can select and control, on the basis of the identification information output by the image recognition processor 11, a gripping operation of the gripper 5b that appropriately corresponds to each type of the industrial parts 10 arranged inside the container 6. As a result, the picking system 1 can classify the industrial parts 10 of the plurality of types, which are randomly placed in the container 6, into the types and divide the classified industrial parts into a plurality of target bins 9.

Figure 2:
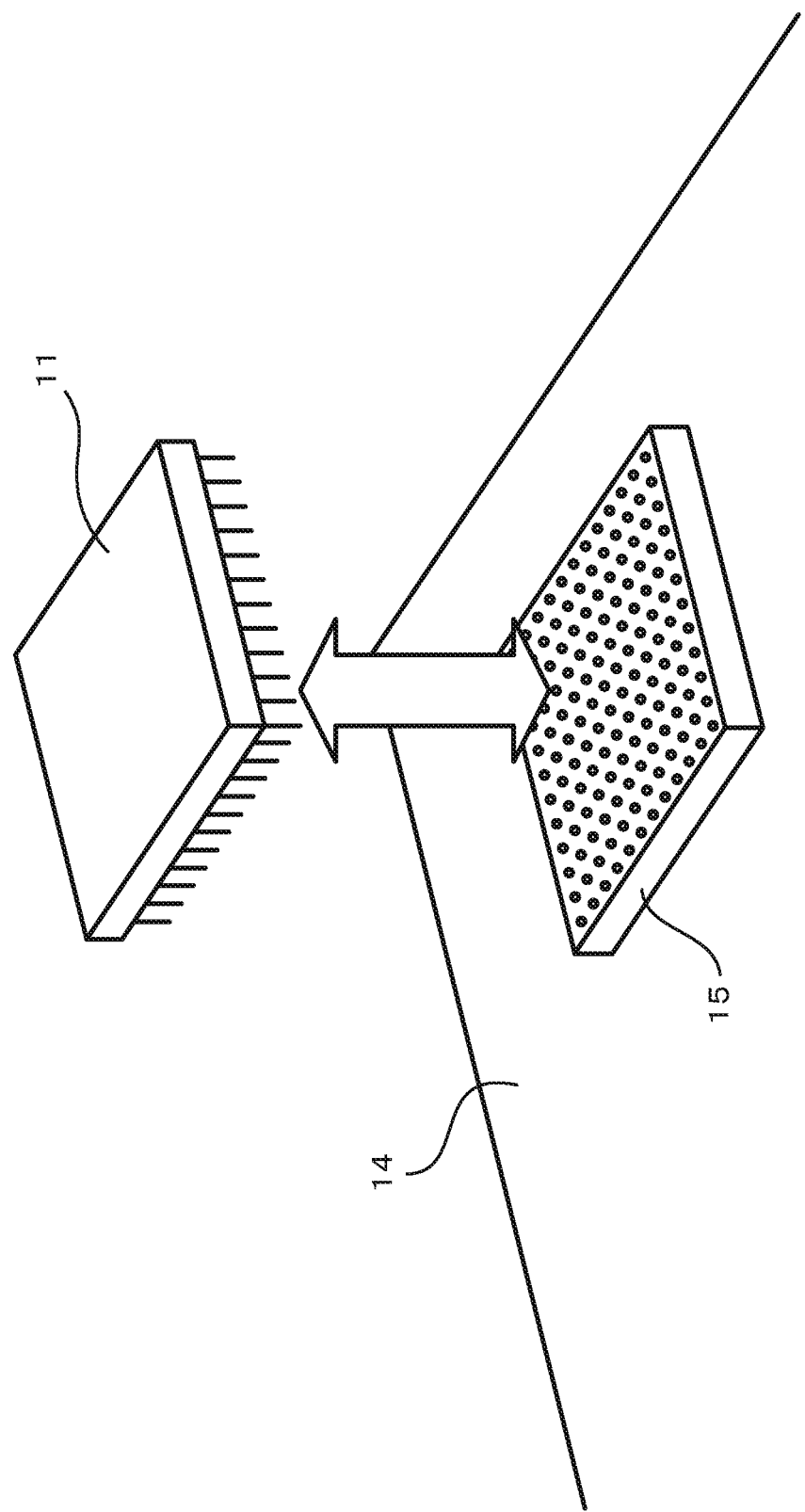
FIG. 2 is a view for illustrating a mechanical configuration that is removably replaceable of the image recognition processor.

Moreover, the image recognition processor 11 used in this embodiment is formed of a single integrated circuit implemented as hardware as described above. For example, as illustrated in FIG. 2, the image recognition processor 11 is formed of a so-called PGA (pin grid array)-type package to be removably replaceable to a socket 15 provided on a circuit board 14 of the robot controller 3. The attachment configuration of the image recognition processor 11 is not limited to the illustrated pin-socket type, and may be another attachment configuration, for example, a cassette-connector type (not shown).

<Features of this Embodiment>

With the advancement of the machine learning technology in recent years, processing accuracy of image recognition for recognizing a predetermined pattern from the image data has been improved dramatically.

However, such image recognition processing by machine learning has been predicated on processing by a large-scale high-performance cloud server, and has required transmission and reception of data via network communication. Therefore, there have been problems of a substantial reduction in processing speed and security. There has also been proposed a configuration in which a so-called GPU (graphic processor unit) is directly connected to a camera configured to capture and generate image data at an operation site, for example, to perform the image recognition processing. However, a memory having a large capacity for storing various kinds of data and parameters and peripheral control circuits are additionally required when the GPU is used. And hence, there have been problems in that a circuit scale is increased to increase the size and weight of the entire device, and in that power consumption is increased. As a result, practical applicability of the image recognition processing in the case of being applied to such an industrial machine as in factory automation has been low.

In contrast, the image recognition processor 11 used in this embodiment is configured as an image recognition processor 11 for an industrial device implementing, on an integrated circuit thereof, the functions of: storing an image data processing algorithm, which has been determined based on prior learning; acquiring image data of an image including a predetermined pattern; and performing recognition processing on the image data based on the image data processing algorithm to output identification information for identifying a recognized pattern. In this manner, only the minimum functions of the pattern recognition and the output of the identification information, which are definitely required at the operation site, for example, a factory in particular, are specially implemented on the integrated circuit, with the result that significant downsizing and reduction in weight, a reduction in power consumption, and an increase in speed of processing can be achieved in the entire device configuration required for the image recognition processing.

<Processing Details of Image Recognition Processor>

Figure 3:
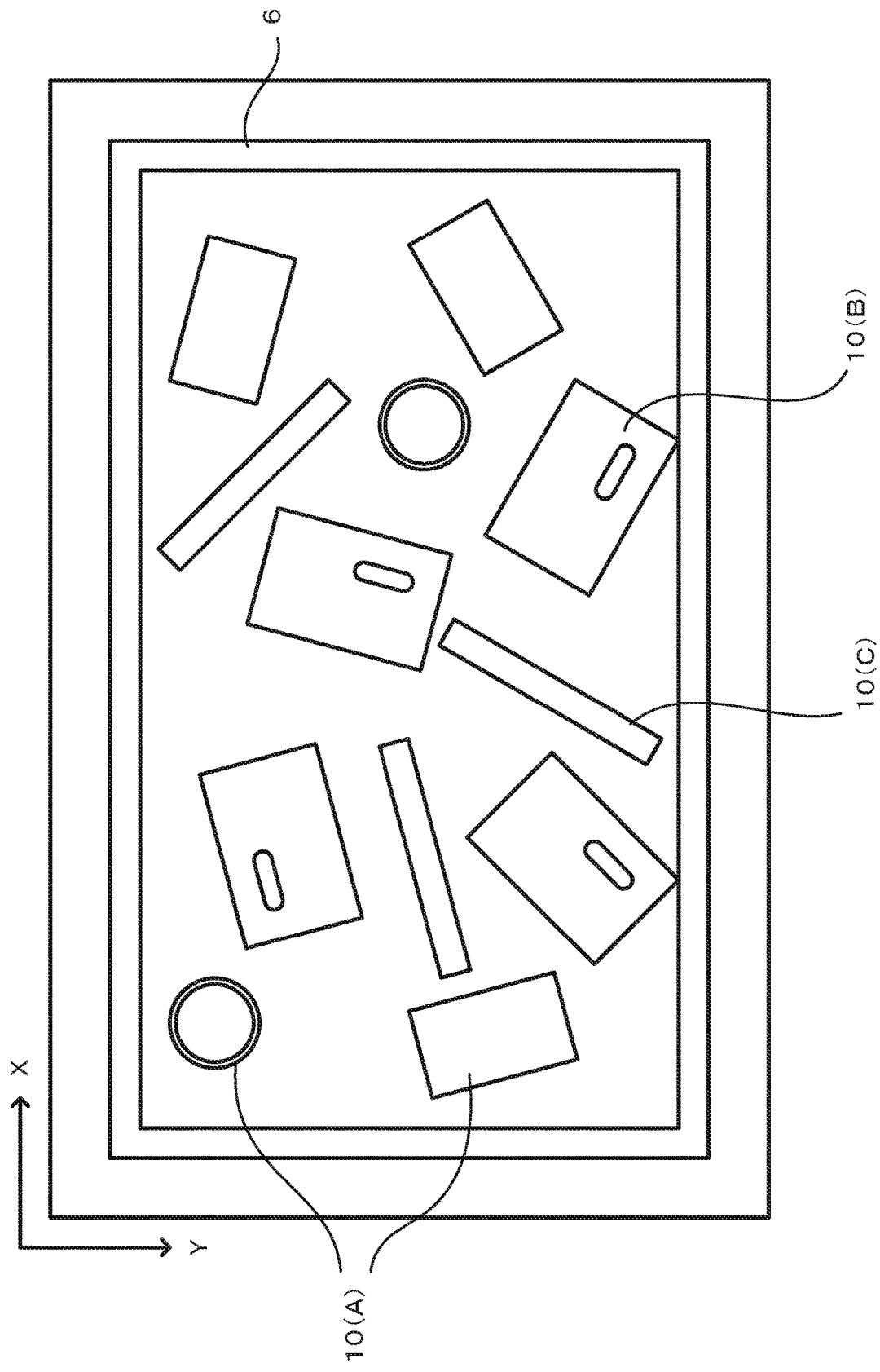
FIG. 3 is a diagram for illustrating an example of image data captured of the inside of a container by a camera.
Figure 4:
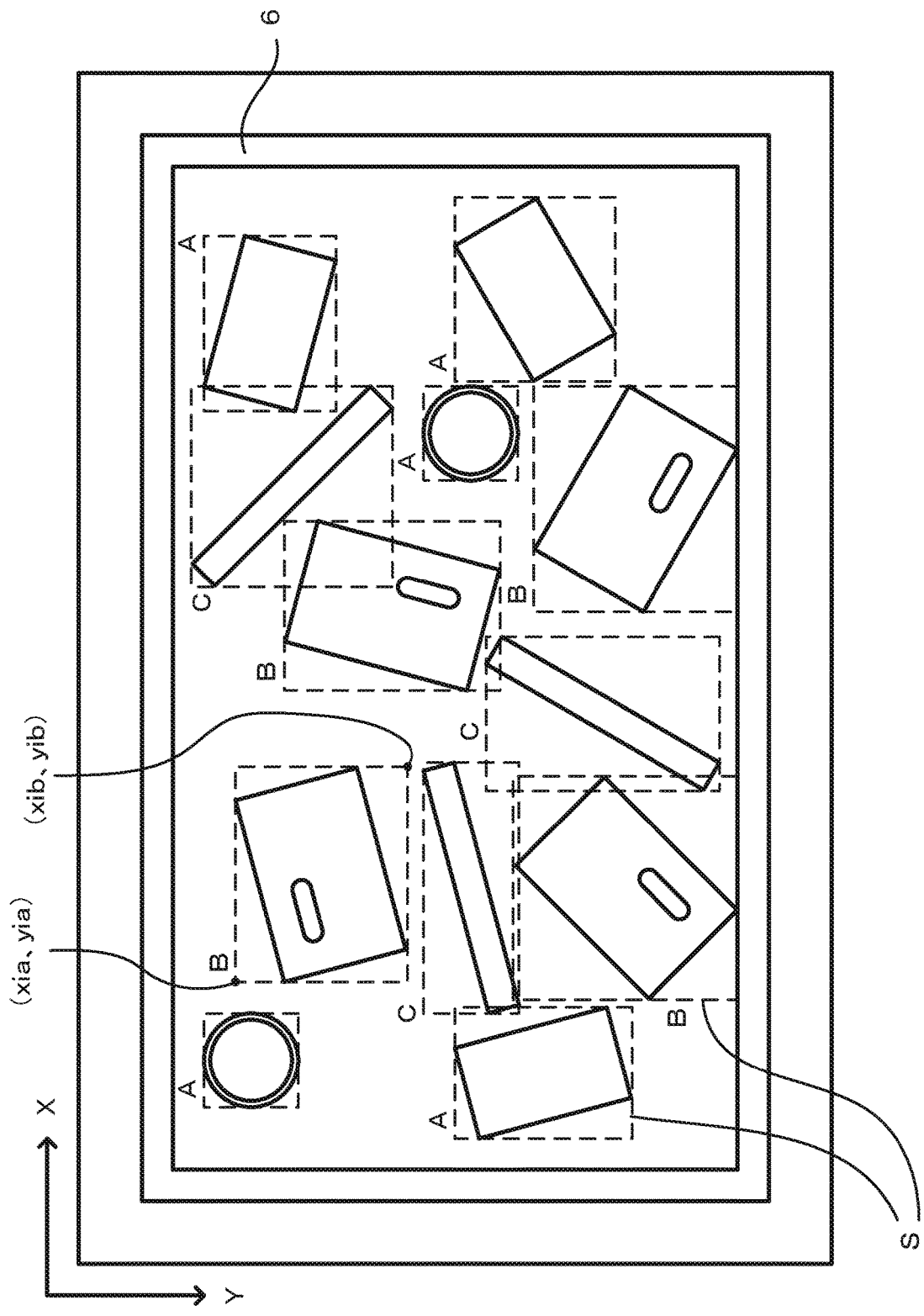
FIG. 4 is a diagram for illustrating an example of a result of image recognition processing performed on the image data by the image recognition processor.

In FIG. 3, there is illustrated an example of the image data captured of the inside of the container 6 by the camera 2 in the picking system 1 in this embodiment, and in FIG. 4, there is illustrated an example of a result of the image recognition processing performed on the image data by the image recognition processor 11.

In the illustrated examples, three types of industrial parts A, B, and C including cylindrical parts A, plate-shaped parts B in which an elliptical through-hole is opened, and rod-shaped parts C that are thinner and longer than the above-mentioned part A are arranged in random postures inside the container. For the parts A of the industrial parts, those in a posture standing upright on one end thereof and those lying on a side surface thereof are mixed. Moreover, for the parts B, those being entirely upside down to have a different arrangement relationship of the elliptical through-hole are mixed.

On the above-mentioned image data, the image recognition processor 11 recognizes patterns of external shapes that are common to the industrial parts A, B, and C of the same type irrespective of the postures of the individuals of the industrial parts A, B, and C, and individually outputs the types corresponding to the patterns as the identification information ("A", "B", and "C" in FIG. 4). In other words, the output of the identification information performed by the image recognition processor 11 in this embodiment is performed by so-called clustering, which includes selective classification into a plurality of types (three types of A, B, and C in this example), which have been prepared in advance, and output of the result.

Moreover, in the illustrated examples, the image recognition processor 11 encloses the arrangement areas of the industrial parts A, B, and C in coordinates X-Y set in the image data by rectangular enclosing boxes S having four sides parallel to the X axis and the Y axis, and individually outputs coordinate positions ((xia, yia) and (xib, yib) in FIG. 4) of two opposing points of the enclosing boxes S.

<Regarding Configuration of Neural Network>

Figure 5:
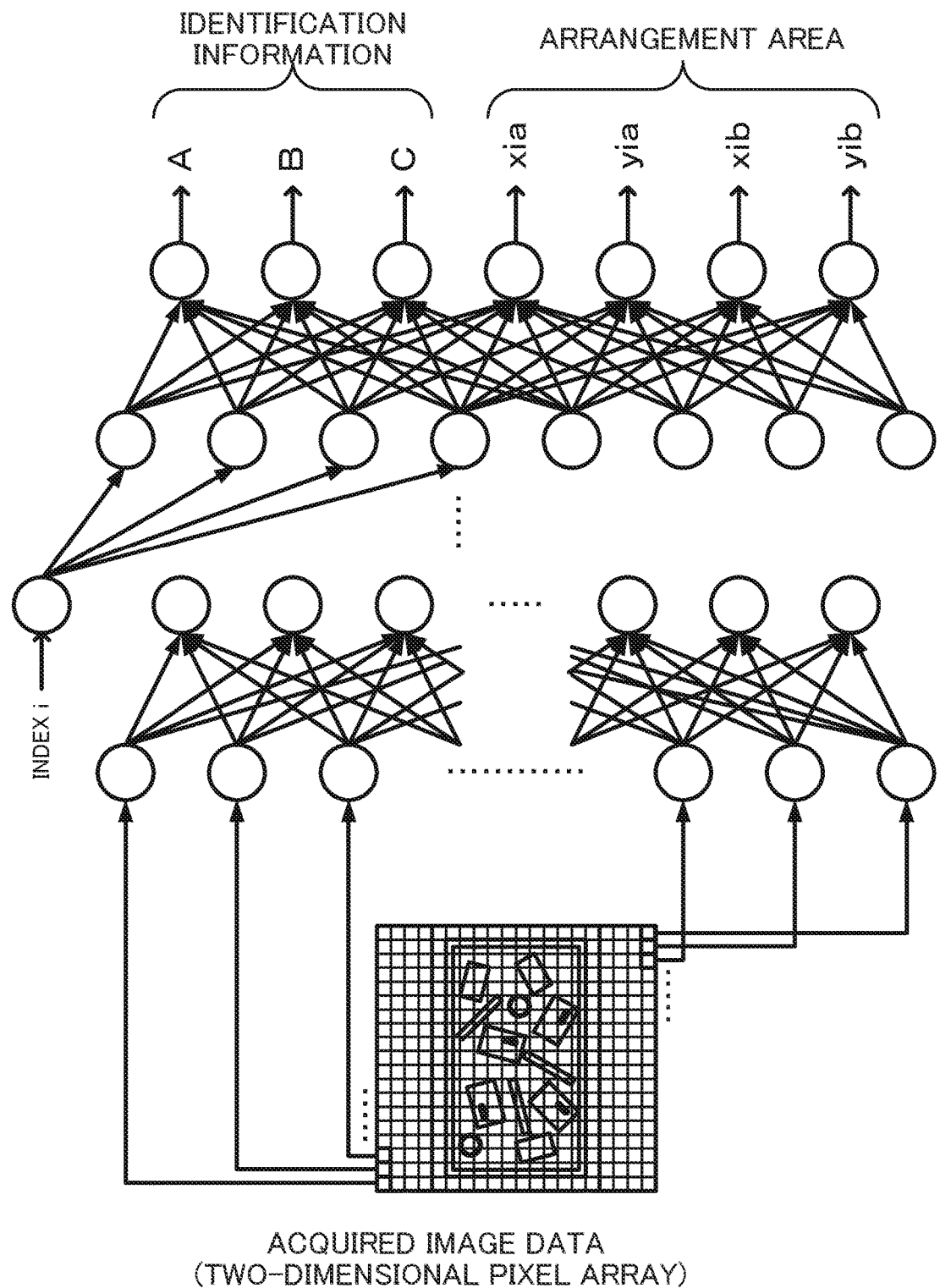
FIG. 5 is a diagram for illustrating an example of a schematic model configuration of a neural network included in the image recognition processor.

As described above, the image recognition processor 11 performs the recognition of the types of the industrial parts 10 and the detection of the arrangement areas by the machine learning using the neural network. The neural network in the example of this embodiment clusters and outputs, as in the schematic model diagram illustrated in FIG. 5, for example, the identification information of the type (A, B, or C) of one industrial part 10 that exists in an image on the basis of the image data of the two-dimensional pixel array input from the camera 2. In the illustrated example, as a specific mode for outputting the identification information, the same number of output nodes as the number of the types (A, B, and C) of the patterns to be recognized are prepared, and a binary output (for example, output in positive logic) is provided from only one output node corresponding to the type of the recognized pattern from among the output nodes. Moreover, the neural network is also designed to output coordinate positions (xia, yia, xib, and yib) of the two opposing points of the enclosing boxes S indicating the arrangement area of the recognized industrial part 10. For the output of the arrangement area, the neural network is designed to output the coordinate positions of integer values by a so-called regression problem.

In the neural network under the above-mentioned basic specifications, when layers near the input layer are configured as convolutional neural networks (not particularly shown), which are combinations of so-called convolutional layers and pooling layers, flexible pattern recognition is achieved, for example. Moreover, layers near the output layer are configured as so-called fully connected layers (not particularly shown) suitable for pattern recognition and calculation of the optimal value, for example.

Moreover, when a plurality of industrial parts 10 exist in the image of the image data as in the example of this embodiment, an index i for specifying an individual one to be subjected to the recognition processing may be input in any one layer, for example, a layer between the above-mentioned convolutional neural networks and the above-mentioned fully connected layers. The index i is an identification number of an individual part that is positioned i-th when scanning in a predetermined direction from the upper left of the image, for example, and the identification information and the arrangement area are output for the industrial part 10 to be recognized that corresponds to the input index i.

The neural network included in the image recognition processor 11 has learned in advance correspondences between patterns of the external shapes in various postures and the identification information of the type to be output for each type of the industrial parts 10 (parts A, B, and C in this example) to be recognized. The learning is performed in advance by a separate learning computer (another information device; not particularly shown) in a design and development stage of the image recognition processor 11. Specifically, the learning computer performs learning by so-called back-propagation processing in which a weighting factor of each edge connecting nodes is adjusted such that a relationship between the input layer and the output layer is established each time a considerable number of pieces of teaching data (data set combining pattern data to be input, identification information data to be output and arrangement area data to be output) is repeatedly given to a neural network model at the equivalent layer structure. In addition to such back propagation, a variety of learning methods, such as so-called autoencoder, dropout, noise addition, and sparse regularization may also be used to increase the processing accuracy. Then, through storing a combined array of weighting factors obtained by the learning in the image recognition processor 11, the neural network that has learned features indicating correspondences between the patterns of the external shapes and the types of the industrial parts 10 can be provided.

As a specific embodiment, the above-mentioned neural network in the image recognition processor 11 may be implemented as software processing to be performed by a so-called von-Neumann type device. For example, an integration operation of outputs of the nodes and weighting factors of edges connected to the nodes, an addition operation of adding results of the integration to each other, and an activation function operation of the nodes to which results of the addition are input may be achieved by software processing to be performed by a von-Neumann type device (integrated circuit equivalent to a so-called GPU or TPU) having a configuration specialized in processing of an inner product operation (tensor operation) of determinants. In this case, sequential processing mainly using digital data (discrete-value data) is used.

Alternatively, as another specific embodiment, the above-mentioned neural network in the image recognition processor 11 may be implemented as hardware in a so-called neuromorphic device. For example, weighting factors of the edges may be stored as physical quantities, such as resistive values and capacitances. An added value of the physical quantities, which indicates an integrated value of the weighting factors and node outputs, which are output as electric currents or voltages is calculated. And then, the added value may be input to another node implementing an activation function as a hardware circuit, to thereby achieve a so-called perception (minimum constituent model of the neural network). In this case, parallel distributed processing using any one or both of digital data (discrete-value data) and analog data (continuous-value data) is used.

Moreover, through configuring the integrated circuit of the image recognition processor 11 in any one of the following forms: a field programmable gate array (FPGA), an application specific integrated circuit (ASIC), and a digital signal processor (DSP), embodiment of the image recognition processor 11 with the use of implementation technologies for the integrated circuit that have hitherto been developed is facilitated.

Moreover, the enclosing boxes S indicating the arrangement areas of the industrial parts 10, which are illustrated in FIG. 4 described above, may be rendered in the image data through processing of the image data. This rendering processing may be performed in the image recognition processor 11, or may be separately performed in a subsequent processing unit (not shown) that has received the coordinate positions (xia, yia, xib, and yib) of the two opposing points of the enclosing boxes S. Moreover, in each of the arrangement areas output by the image recognition processor 11, the posture of the industrial part 10 that is present in the arrangement area may be detected separately as a three-dimensional CAD model (model prepared in advance to correspond to the type of the identification information), for example, by another processing unit (not shown) of the robot controller 3 with the use of a 3D laser scanner or the like (not particularly shown).

In the above description, a network connection configuration of the neural network and the combined array of the weighting factors of the edges as a whole correspond to the image data processing algorithm in the appended claims. Moreover, when the neural network is implemented as the above-mentioned von-Neumann type device, a memory region configured to store the network connection configuration of the neural network and a determinant corresponding to the combined array of the weighting factors of the edges correspond to a storage unit. A computing unit configured to perform the determinant operation corresponds to a recognition processing unit in the appended claims. Moreover, when the neural network is implemented as the above-mentioned neuromorphic device, the entire hardware circuit forming the neural network corresponds to the storage unit and the recognition processing unit of the appended claims.

<Effects of this Embodiment>

As described above, the image recognition processor 11 according to this embodiment implements, on the integrated circuit thereof, the functions of: storing the image data processing algorithm, which has been determined based on the prior learning; acquiring the image data of the image including the predetermined pattern; and performing recognition processing on the image data based on the image data processing algorithm to output the identification information for identifying the recognized pattern. For example, an image recognition processor specialized for prepared foods and an image recognition processor specialized for fish fillets may be generated when the objects are foods, an image recognition processor specialized for screws and an image recognition processor specialized for connecting rods may be generated when the objects are industrial goods, an image recognition processor specialized for lipsticks and an image recognition processor specialized for perfume bottles may be generated when the objects are cosmetics, an image recognition processor specialized for cold medicines and an image recognition processor specialized for gastrointestinal medicines may be generated when the objects are medicines, and an image recognition processor specialized for scissors may be generated when the objects are stationery items, for example. As described above, only the minimum functions of pattern recognition and output of the identification information, which are required at the operation site, for example, a factory in particular, are specifically implemented on the integrated circuit, with the result that significant downsizing and reduction in weight, a reduction in power consumption, and an increase in speed of processing can be achieved in the entire device configuration required for the image recognition processing. As a result, the practical applicability of the image recognition processing can be improved.

Moreover, particularly in this embodiment, the output of the identification information of the recognized pattern is performed through selective classification into a plurality of types of patterns, which have been prepared in advance, and clustering output of the result. As a result, a circuit scale of the integrated circuit can be simplified through limitation of the types of patterns to be recognized to the plurality of types corresponding to the application (industrial goods, foods, or the like) of the image recognition processing. Moreover, the types to be output are clarified to facilitate selection of subsequent control (selective picking control in the operation planning unit 12 of the robot controller 3) to be performed in correspondence with each type. In the above-mentioned embodiment, there has been adopted a mode in which the same number of output nodes as the number of types (A, B, and C) of the patterns to be recognized are prepared, and in which a binary output (for example, output in positive logic) is provided from only one output node corresponding to the type of the recognized pattern from among the output nodes, but the present invention is not limited thereto. For example, there may be adopted a mode in which an output is provided in a binary expression obtained by combining binary outputs of a plurality of output nodes.

Moreover, particularly in this embodiment, the image recognition processor 11 detects and outputs the arrangement area of the recognized pattern in the image of the image data. As a result, in an imaging field of the camera 2, which has captured the image data, the arrangement position of the industrial part 10 corresponding to the recognized pattern can be roughly grasped. The arrangement position can be used when picking or other handling is performed on the basis of the identification information of the recognized pattern.

Moreover, especially in this embodiment, the output of the arrangement area includes outputting in the image through processing of the image data (rendering of the enclosing box). As a result, when the image of the image data is displayed on a display (not particularly shown) or other device, the arrangement position of the industrial part 10 corresponding to the recognized pattern can be visually displayed. The rendering output of the arrangement area in the image is not limited to the enclosing box S described above. For example, the arrangement area may be expressed by filling (filling with a color corresponding to the identification information) of pixels of the entire recognized pattern in the image, for example.

Moreover, especially in this embodiment, the algorithm is processed by the neural network (deep learning) that has learned the correspondence between the pattern to be recognized and the identification information. As a result, the pattern recognition can be performed at high speed and with high accuracy with low power consumption. As the machine learning applied to the image recognition processor 11, in addition to the deep learning with the use of the neural network, another machine learning method by means of data mining, for example, a support vector machine may be applied.

Moreover, especially in this embodiment, the neural network is implemented as software processing to be performed by the von-Neumann type device (sequential processing device), which enables implementation that is highly compatible with another von-Neumann type device (for example, so-called CPU) used in the subsequent control of the image recognition processor 11 relating to an installation environment such as power supply.

Moreover, especially in this embodiment, the neural network is implemented as hardware in the neuromorphic device (parallel distributed processing device), further reduction in power consumption, downsizing and reduction in weigh, and increase in speed of processing are achieved.

Moreover, especially in this embodiment, the integrated circuit is configured in any one of the following forms: a field programmable gate array (FPGA), an application specific integrated circuit (ASIC), and a digital signal processor (DSP), embodiment of the image recognition processor 11 with the use of the implementation technologies for the integrated circuit that have hitherto been developed is facilitated.

The image recognition processor 11 according to this embodiment is assumed to implement the neural network that has learned the various patterns to be recognized and the recognition algorithm for the various patterns, but the present invention is not limited thereto. In addition, when the integrated circuit of the image recognition processor 11 is implemented in the form of the FPGA, the algorithm may be implemented to be rewritable. As a result, when the algorithm is processed by the neural network, for example, design of the connection configuration of the entire neural network, and learning and setting of the weighting factors can be rewritten on the user's side, and hence versatility of the image data recognition processing is improved. Moreover, updating through rewriting to a new algorithm implementing a neural network that is more advanced in learning is facilitated.

Moreover, especially in this embodiment, the algorithm is determined by the learning performed in advance with the use of another information device (learning computer). As a result, a hardware resource required for the learning for determining the algorithm can be formed of an information device that is separate from the robot controller 3, and hence configuration scales of the image recognition processor 11 and the robot controller 3 on which the image recognition processor 11 is mounted or other application device can be significantly simplified.

Moreover, especially in this embodiment, the robot controller 3 performs predetermined picking control on the industrial part 10 corresponding to the pattern recognized by the image recognition processor 11. As a result, the image recognition processor 11 may be incorporated simply as an image recognition interface, and execution of various kinds of subsequent control corresponding to the identification information of the output pattern can be achieved.

Moreover, especially in this embodiment, the robot controller 3 includes the image recognition processor 11 to be removably replaceable. As a result, a main body of the robot controller 3 can be shared such that, in addition to the industrial parts 10 in the example of the above-mentioned embodiment, an image recognition processor 11 specialized for classification of an object to be recognized, for example, a food, can be replaced to improve versatility of the robot controller 3. Moreover, updating through replacement by a new image recognition processor 11 implementing the neural network that is more advanced in learning is facilitated.

MODIFICATION EXAMPLE

Note that, the above-described embodiments are not limited to the above-mentioned embodiment, and various modifications are possible within the range not departing from the gist and technical concept thereof.

Figure 6:
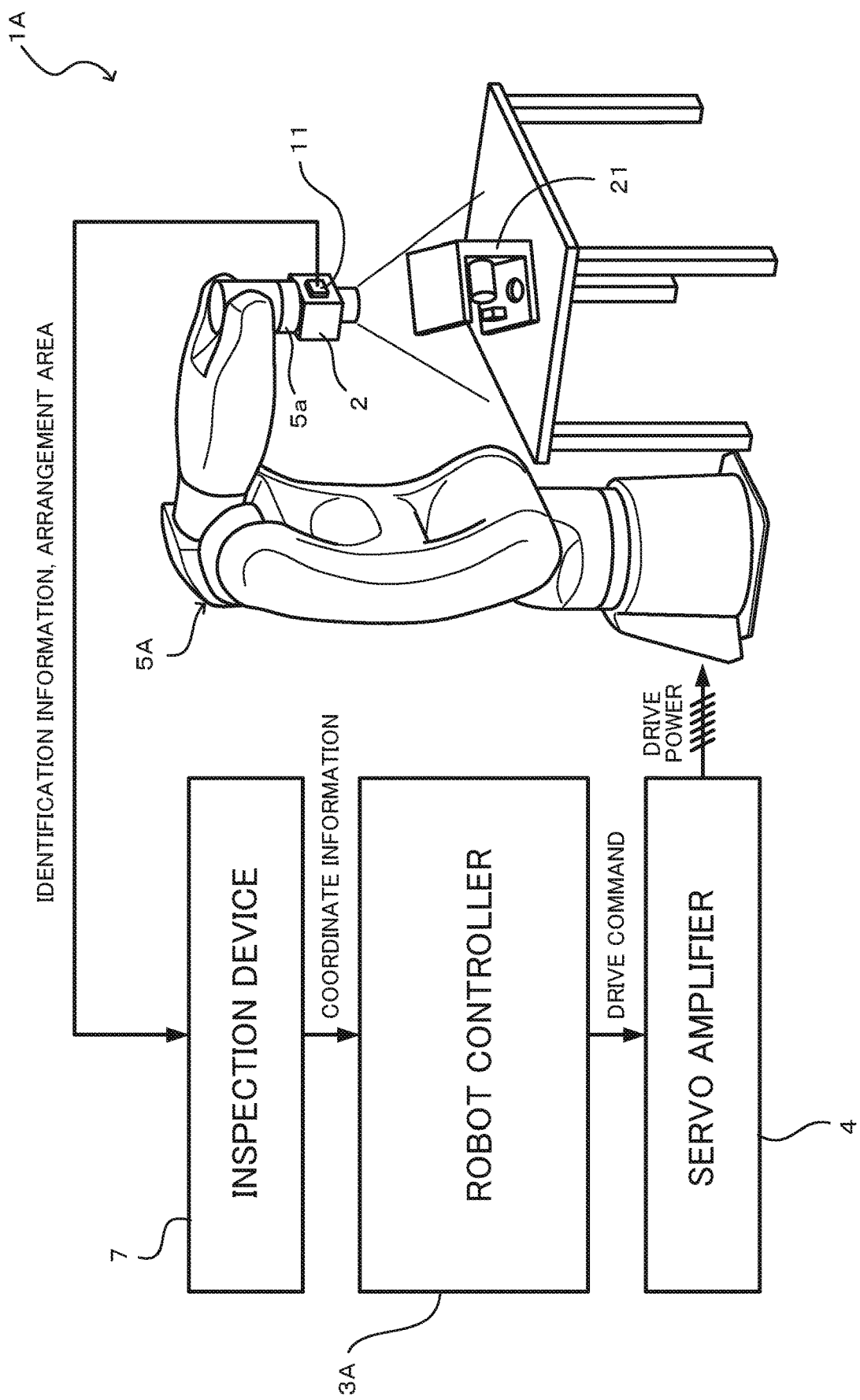
FIG. 6 is a diagram for illustrating an example of a schematic system block configuration of an inspection system including the image recognition processor.

Modification Example 1: A Case in which the Camera and the Image Recognition Processor are Installed on the Arm Distal End Portion For example, in the above-mentioned embodiment, the image data has been acquired by fixed-point imaging in which the camera 2 is fixed, but the present invention is not limited thereto. For example, as illustrated in FIG. 6, the camera 2 may be fixed on the arm distal end portion 5a of a six-axis robot 5A, and a shape of a detailed part forming a target structure 21 may be imaged from various lines of sight to perform assembly inspection of the structure 21.

In this case, the image recognition processor 11 recognizes, from the image data, a pattern of the detailed part to be inspected, and outputs the identification information and the arrangement areas. Based on the identification information and the arrangement areas, an inspection device 7 determines an inspection result. Moreover, the inspection device 7 outputs coordinate information of the detailed part, on the basis of which a robot controller 3A can grasp a posture and arrangement of the structure 21. As a result, even when the structure 21 is arranged in indefinite posture and position, the robot controller 3A can grasp the posture and position of the structure 21 in the operation coordinates set in the six-axis robot 5A.

In such an inspection system 1A (industrial device), when a long and thick cable required to transmit the image data of the camera 2 is routed along a robot arm of the six-axis robot 5A, the weight of the cable tends to adversely affect arm operation control, and the cable tends to interfere with the outside to hinder the operation control of the robot arm. However, when the image recognition processor 11 is also installed on the arm distal end portion 5a and near the camera 2 as illustrated in FIG. 6, and a signal line for transmitting information on the identification information and the arrangement areas from the image recognition processor is wired inside the robot arm, advantages can be obtained in that the entire robot arm is reduced in weight, and in that the interference with the outside can be avoided. In this case, the configuration of the image recognition processor 11 being lightweight and implemented on the integrated circuit also provides an advantage in that there is no significant effect on the operation control of the robot arm.

<Modification Example 2: A Case in which Pattern Recognition is Performed with a Plurality of Sets of Image Data Captured by a Plurality of Cameras>

Figure 7:
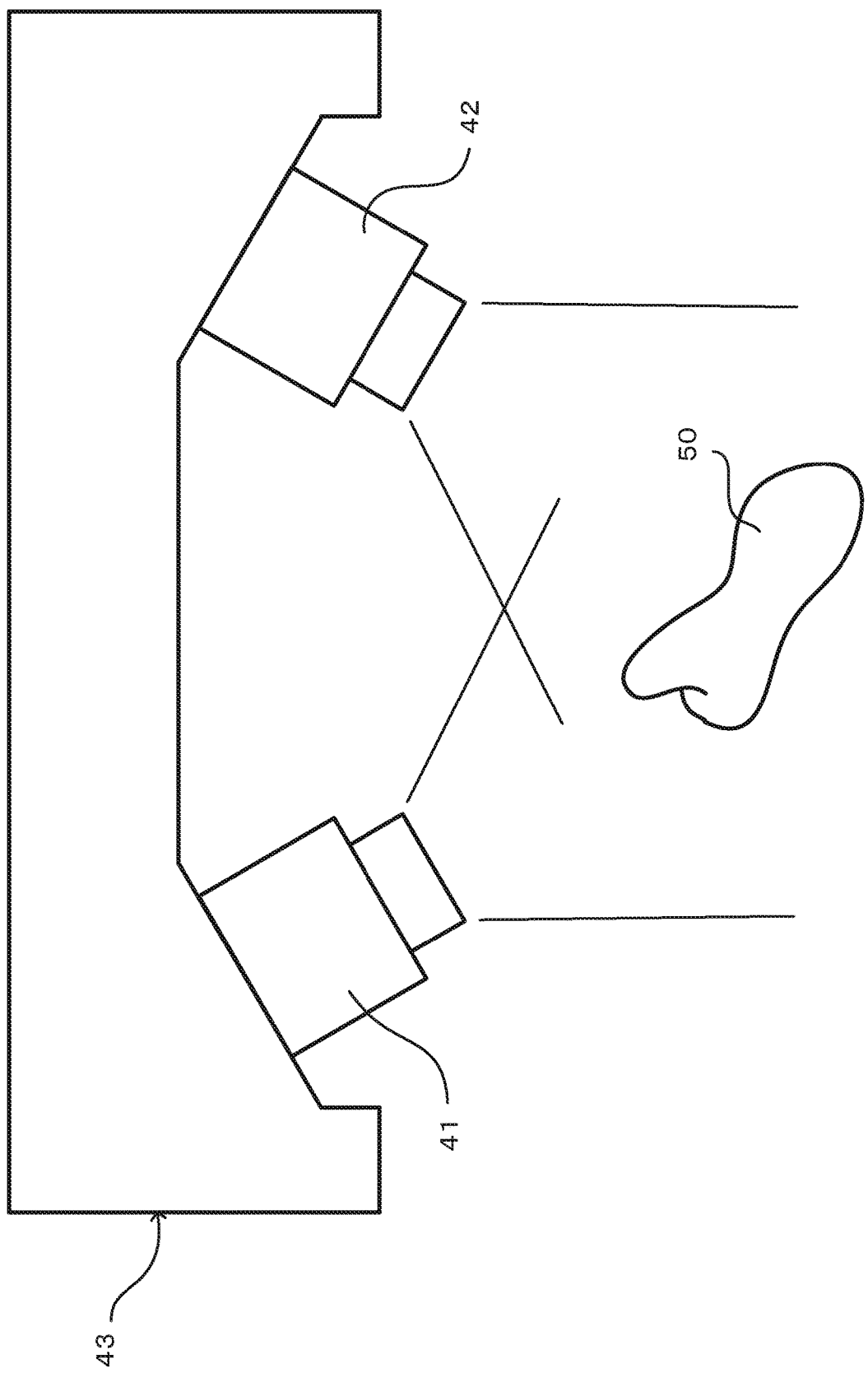
FIG. 7 is a diagram for illustrating a configuration example in which image data of a food is acquired by a three-dimensional camera.

In an example illustrated in FIG. 7, one food 50 (in the illustrated example, fried chicken) is imaged from different imaging directions with the use of a so-called three-dimensional camera 43, which is formed of two cameras 41 and 42 having overlapping imaging areas. As a result, as illustrated on the left side of FIG. 8, two sets of image data (each set being a two-dimensional pixel array) having a parallax from each other can be acquired for one food 50.

Figure 8:
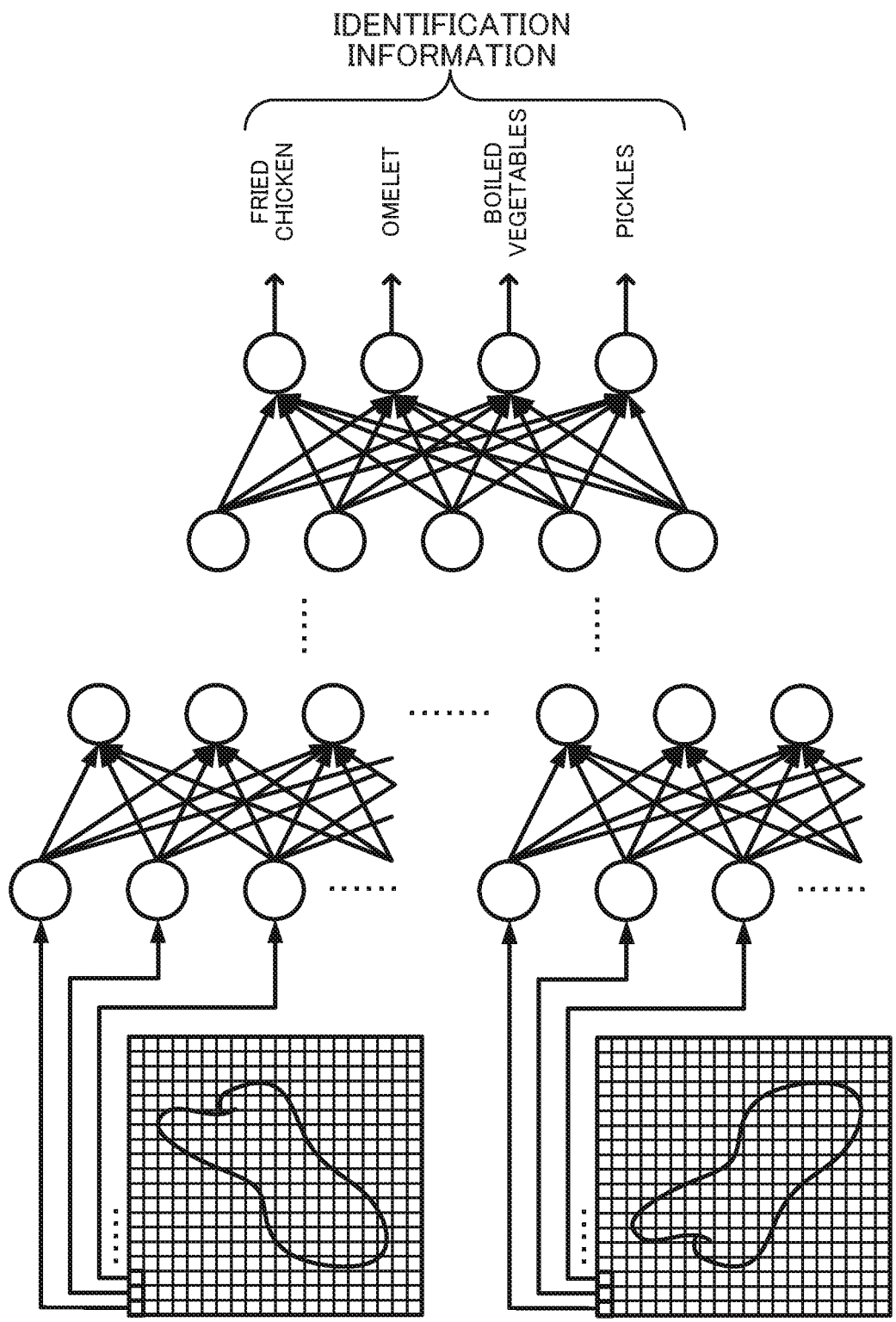
FIG. 8 is a diagram for illustrating an example of a schematic model configuration of a neural network in a case where identification information is output on the basis of two sets of image data.

In the example illustrated in FIG. 8, the neural network of the image recognition processor 11 is designed so that the above-mentioned two sets of image data are individually input thereto, and so as to recognize a shape pattern of the food 50 on the basis of the two sets of food data. Through use of the three-dimensional image data in this manner, space recognition accuracy of a solid shape is improved especially for the food 50 having indefinite shape and size. Three or more cameras may be used as long as imaging regions thereof overlap, and the pattern recognition may be performed in the same fully connected layer after each set of image data is processed in individual convolutional neural networks in the neural network of the image recognition processor 11.

Other Modification Examples

Moreover, although not particularly shown, as optical sensing means for acquiring the image data of the object, a laser scanner or the like may be used instead of the camera 2 (and the three-dimensional sensor 8). In this case, a distance to each point on the surface of the object is measured with a scanning line projected by the laser scanner, and the image data is acquired as a set of distance data, for example.

In the above description, when the terms "vertical", "parallel", and "planar" are used, the terms are not used in a strict sense. In other words, the terms "vertical", "parallel", and "planar" allow design and manufacturing tolerances and errors, and mean "substantially vertical", "substantially parallel", and "substantially planar".

Moreover, in the above description, when apparent dimensions, size, shape, position, and the like are described as "the same", "identical", "equal", and "different", the terms are not used in a strict sense. In other words, the terms "the same", "equal", and "different" allow design and manufacturing tolerances and errors, and mean "substantially the same", "substantially identical", "substantially equal", and "substantially different".

Moreover, in addition to the above description, the above-mentioned embodiment and methods in the modification examples may be used in combination as appropriate. Further, although not illustrated one by one, the above-mentioned embodiment and modification examples are embodied with various alterations without departing from the spirit thereof.

The invention claimed is:

1. An image recognition device comprising:
an image recognition processor removably replaceable to a corresponding socket, the image recognition processor storing an image data processing neural network, which has been determined based on prior learning,
the image recognition processor storing the image data processing neural network configured to accept image data captured by a camera,
the image recognition processor storing the image data processing neural network configured to output identification information corresponding to a classification of a target to be recognized, and an arrangement area of the target in an image of the image data, and
wherein the image data processing neural network has learned in advance for each classification of the target.

2. The image recognition device according to claim 1, wherein the image recognition processor storing the image data processing neural network is further configured to output the arrangement area by outputting in the image through processing of the image data.

3. A picking system comprising:
an image recognition processor removably replaceable to a corresponding socket, the image recognition processor storing an image data processing neural network, which has been determined based on prior learning,
the image recognition processor storing the image data processing neural network configured to accept image data captured by a camera,
the image recognition processor storing the image data processing neural network configured to output identification information corresponding to a classification of a target to be recognized, and an arrangement area of the target in an image of the image data,
wherein the image data processing neural network has learned in advance for each classification of the target;
wherein the image recognition processor storing the image data processing neural network is further configured to output the arrangement area by outputting in the image through processing of the image data;
the picking system further comprising:
a socket receiving an image recognition processor;
a camera;
a robot; and
an operation planning unit,
wherein the camera outputs the image data captured to the socket,
wherein the operation planning unit plans and outputs specific operation instructions to be performed by the robot based on the identification information and the arrangement areas input from the socket.

* * * * *